United States Patent
Mehlhorn et al.

(10) Patent No.: US 7,045,979 B2
(45) Date of Patent: May 16, 2006

(54) MULTIPLE-SPEED ELECTRIC MACHINE AND METHOD OF OPERATING THE SAME

(75) Inventors: William Louis Mehlhorn, Menomonee Falls, WI (US); William James Watkins, Tipp City, OH (US); Jevon Darvell Reynolds, Dayton, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 23 days.

(21) Appl. No.: 10/789,314

(22) Filed: Feb. 27, 2004

(65) Prior Publication Data

US 2004/0169479 A1    Sep. 2, 2004

Related U.S. Application Data

(60) Provisional application No. 60/450,759, filed on Feb. 28, 2003.

(51) Int. Cl.
*H02P 1/54* (2006.01)
(52) U.S. Cl. ............ 318/109; 318/108; 318/772; 318/774; 318/781; 318/800; 318/811
(58) Field of Classification Search ........ 318/108, 318/109, 422, 722–786, 800
See application file for complete search history.

(56) References Cited

U.S. PATENT DOCUMENTS

| 3,671,830 A | * | 6/1972 | Kruper ............... 318/786 |
| 3,792,324 A | | 2/1974 | Suarez et al. |
| 3,970,908 A | * | 7/1976 | Hansen et al. ........ 318/786 |
| 4,047,082 A | * | 9/1977 | Scheuer et al. ....... 318/782 |
| 4,313,075 A | | 1/1982 | Stewart et al. |
| 4,382,217 A | | 5/1983 | Horner et al. |
| 4,453,118 A | * | 6/1984 | Phillips et al. ....... 318/779 |
| 4,623,829 A | | 11/1986 | Smith et al. |
| 4,764,714 A | | 8/1988 | Alley et al. |
| 4,804,901 A | * | 2/1989 | Pertessis et al. ...... 318/786 |
| 4,843,295 A | | 6/1989 | Thompson et al. |
| 4,862,053 A | * | 8/1989 | Jordan et al. ........ 318/786 |
| 4,950,969 A | | 8/1990 | Getz |
| 5,159,255 A | | 10/1992 | Weber |
| 5,227,710 A | * | 7/1993 | Lewus ............... 318/781 |
| 5,237,256 A | | 8/1993 | Bashark |
| 5,280,227 A | | 1/1994 | Bashark |
| 5,350,992 A | | 9/1994 | Colter |
| 5,514,943 A | * | 5/1996 | Shapess ............. 318/772 |
| 5,561,357 A | | 10/1996 | Schroeder |
| 5,654,620 A | | 8/1997 | Langhorst |
| 5,734,248 A | | 3/1998 | Kemp et al. |
| 5,883,488 A | * | 3/1999 | Woodward .......... 318/786 |
| 6,034,503 A | * | 3/2000 | Pertessis ........... 318/785 |
| 6,121,746 A | | 9/2000 | Fisher et al. |

(Continued)

FOREIGN PATENT DOCUMENTS

EP        1496617      *   6/2004

*Primary Examiner*—Marlon Fletcher
*Assistant Examiner*—Tyrone Smith
(74) *Attorney, Agent, or Firm*—Michael Best & Friedrich LLP

(57) ABSTRACT

An electric machine assembly having an electric machine. The electric machine can include a first speed circuit and a second speed circuit. In some constructions, both speed circuits can be of a permanent split capacitor design. At least one of the speed circuits can include a switch that is controlled by the controller to limit current through an auxiliary circuit of the unused speed circuit when certain conditions exist.

21 Claims, 4 Drawing Sheets

U.S. PATENT DOCUMENTS 6,160,372 A * 12/2000 Cusack .................. 318/786
6,329,783 B1 * 12/2001 Vrionis et al. ............. 318/772
6,329,785 B1    12/2001 Starkie et al.
6,346,790 B1     2/2002 Kemp et al.

* cited by examiner

MULTIPLE-SPEED ELECTRIC MACHINE AND METHOD OF OPERATING THE SAME

CROSS REFERENCE TO RELATED APPLICATION

This application claims the benefit of U.S. Provisional Application No. 60/450,759, filed Feb. 28, 2003, the entire contents of which are incorporated by reference herein.

FIELD OF THE INVENTION

The invention generally relates to electric machines, and more specifically to multiple-speed electric machines (e.g., two-speed electric machines) and methods of operating the same.

BACKGROUND OF THE INVENTION

It has become increasingly important to provide electric machines that are higher in efficiency and lower in noise levels. The need for higher efficiency designs are a result of both competitive pressures and the desire to save energy. Reduced noise levels can be important where user comfort to motor noise is a concern. Reduced noise levels can also be important where motor noise can be a nuisance to others (e.g., neighbors of a spa owner that has the spa placed outdoors).

SUMMARY OF THE INVENTION

Accordingly, the invention provides an assembly that includes an electric machine (e.g., a two-speed permanent split capacitor (PSC) motor) and a controller. The electric machine can include a first speed circuit and a second speed circuit. In some constructions, both speed circuits can be of a PSC design. At least one of the speed circuits can include a switch that is controlled by the controller to limit current through an auxiliary circuit of the unused speed circuit when certain conditions exist.

In one construction, the invention provides a method of controlling an electric machine that includes a rotor and a stator. The method can comprise providing an electric machine having a first speed circuit and a second speed circuit. The first speed circuit can include a first main winding, an auxiliary winding, and a switch connected in series with the auxiliary winding. The second speed circuit can include a second main winding. The method can also comprise providing an operational power to one of the first speed circuit and the second speed circuit, and controlling the switch to limit current through the auxiliary winding based at least in part on the provision of the operational power to the second speed circuit.

In another construction, the invention provides an electric machine assembly that can comprise a shaft, a rotor connected to the shaft for rotation with the shaft, a first speed circuit, a second speed circuit, and a controller. The first speed circuit can include a first main circuit, a first auxiliary circuit, and a switch connected in series with the first auxiliary circuit, the first speed circuit being configured to cause the rotor and shaft to rotate at a first speed when an operational power is provided to the first speed circuit. The second speed circuit can include a second main circuit and a second auxiliary circuit, the second speed circuit being configured to cause the rotor and shaft to rotate at a second speed when an operational power is provided to the second speed circuit. The controller can be configured to control operation of the switch based at least in part on whether an operational power is provided to the first speed circuit or the second speed circuit. The controller can control the switch to limit current through the switch when the second speed circuit receives the operational power.

In yet another construction, the invention provides a method of controlling an electric machine that includes a rotor and a stator. The method can comprise providing an electric machine having first and second speed circuit of a permanent split capacitor design. The first speed circuit can include a first main circuit having a first main winding, a first auxiliary circuit having a first phase winding and a first capacitor connected in series with the first phase winding, and a solid-state switch connected in series with the auxiliary circuit. The second speed circuit can include a second main circuit having a second main winding, and a second auxiliary circuit having a second phase winding and a second capacitor connected in series with the second phase winding. The method can also comprise providing an operational power to one of the first speed circuit and the second speed circuit, and controlling the solid-state switch to allow current through the auxiliary winding based at least in part on the provision of the operational power to the first speed circuit.

Further aspects of the invention together with the organization and manner of operation thereof will become apparent from the following detailed description of the invention when taken in conjunction with the accompanying drawings wherein like elements have like numerals throughout the drawings.

BRIEF DESCRIPTION OF THE DRAWINGS

The invention is further described with reference to the accompanying drawings which show constructions of the invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, a circuit is a conductor or system of conductors through which an electric current can or is intended to flow. As used herein, a block is an assembly of circuits and/or components that function as a unit. As used herein, a speed circuit of a permanent split capacitor design comprises a closed loop formed of a main circuit and an auxiliary circuit during normal operation of the respective speed circuit. The main circuit and the auxiliary circuit do not necessarily need to remain connected when the speed circuit is not being operated and/or when certain conditions exist during operation of the speed circuit.

DETAILED DESCRIPTION

In some applications (e.g., spas), electric machines such as permanent split capacitor (PSC) motors have been utilized to provide increased efficiency and reduced noise levels. Motors (e.g., PSC motors) that are powered by a single-phase power source often utilize auxiliary circuits to enhance motor operation (e.g., starting operation of the motor). Various mechanisms have been implemented to switch-out or remove auxiliary circuits. For example, a centrifugal switch can be mounted on the shaft of the motor to sense the rotational speed of the shaft and open the auxiliary circuit contacts at an appropriate rotational speed (e.g., approximately 75% to 80% of the rated running speed of the motor). However, because the auxiliary circuit of the PSC design remains connected during normal operation of the motor (i.e., the main circuit and the auxiliary circuit form a permanently connected or closed loop), no such switch-out mechanism has been required.

The PSC design has been found to be particularly effective when utilized in single-speed motors. However, for two-speed motors, designing the motor with a PSC low-speed circuit and a PSC high-speed circuit can result in what is known as a tank or parallel resonant circuit. When the motor runs at a first speed (e.g., a high-speed), current through a first closed loop (e.g., a high-speed closed loop) generates a magnetic field which can induce a current through a second closed loop (e.g., a low-speed closed loop). The unintended current through the unused closed loop can result in unfavorable operating characteristics of the motor (e.g., reduced efficiency, increased noise, and the like). As a result, motor manufacturers typically do not produce two-speed motors that include two speed circuits of a PSC design, but instead produce two-speed motors that include a first speed circuit of a PSC design and a second speed circuit of another design (e.g., a capacitor-start design, a split-phase design, and the like). Generally, the low-speed circuit of such motors includes the non-PSC design.

Although two-speed motors that include a non-PSC speed circuit do not include the tank circuit and, accordingly, the corresponding problems discussed above, such two-speed motors also do not operate as efficiently as a motor having two speed circuits of a PSC design where each speed circuit is allowed to operate independently without interference from the unused speed circuit. The difference in efficiency between a two-speed motor that includes only one PSC speed circuit and a two-speed motor that includes two PSC speed circuits is especially noticeable in applications (e.g., spas) where the motor is typically operated using the non-PSC speed circuit (e.g., in a low-speed mode).

Figure 1:
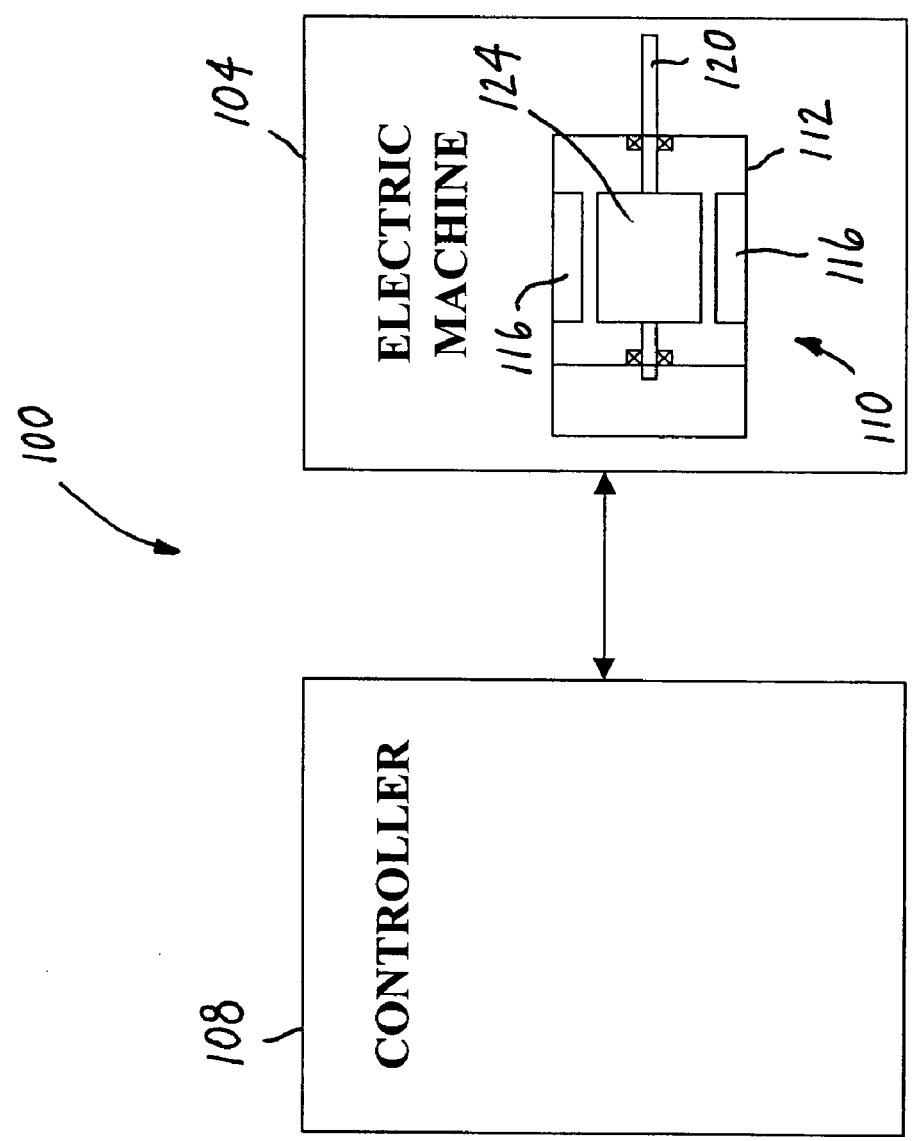
FIG. 1 illustrates an electric machine assembly that incorporates aspects of the invention.

FIG. 1 illustrates an electric machine assembly 100 incorporating aspects of the invention. The electric machine assembly 100 includes an electric machine 104 and a controller 108 connected to the electric machine 104. The controller 108 can be mounted to the electric machine 104 and/or located remotely from the electric machine 104. The illustrated electric machine 104 comprises a two-speed PSC motor 110 as discussed further below. In other constructions, the electric machine 104 can comprise other types of electric motors and/or other types of electric machines having a rotor and a stator.

As schematically illustrated in FIG. 1, the PSC motor 110 includes a housing 112, a stator 116 fixed relative to the housing 112, a shaft 120 rotatable relative to the housing 112 about a shaft axis (e.g., via one or more bearings), and a rotor 124 connected to the shaft 120 for rotation therewith relative to the stator 116. The stator 116 includes a plurality of windings (e.g., the main windings and phase windings discussed below).

Figure 2:
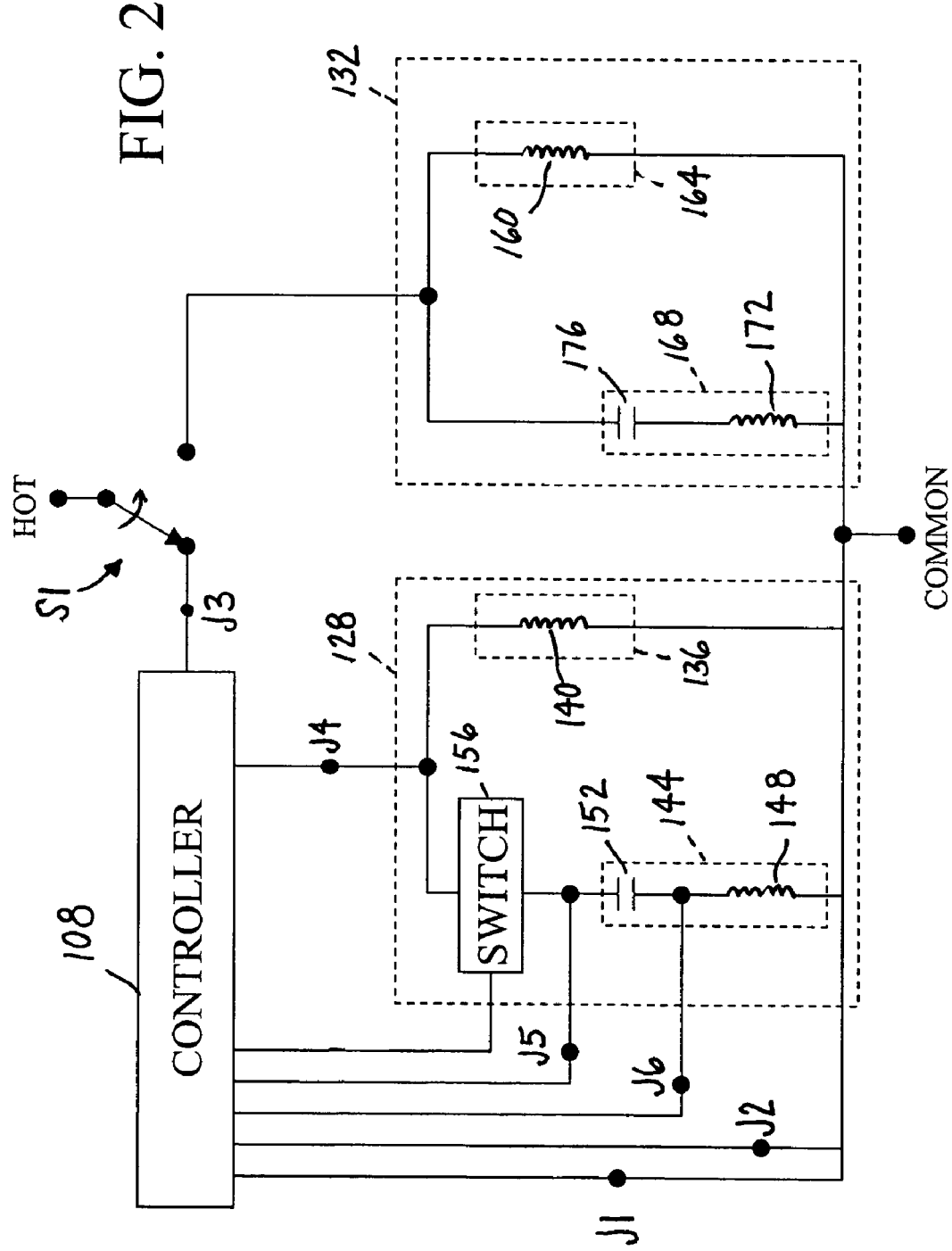
FIG. 2 illustrates a first speed circuit and a second speed circuit of the electric machine illustrated in FIG. 1.

With reference to FIG. 2, the PSC motor 110 includes a first speed circuit 128 of a PSC design and a second speed circuit 132 of a PSC design. In other constructions, the PSC motor 110 can include two or more speed circuit, each of which may provide single speed operation and/or variable speed operation. The illustrated first speed circuit 128 (e.g., a low-speed circuit) includes a main circuit 136 having a main winding 140, an auxiliary circuit 144 having a phase winding 148 and a capacitor 152, and a switch 156 associated with the auxiliary circuit 144. In the illustrated construction, the switch 156 is connected in series with the auxiliary circuit 144. The switch 156 can be any switch that prevents/allows current through the auxiliary circuit 144 in response to a control signal. In the illustrated construction, the switch 156 is a solid-state switch such as a triac. In other constructions, the switch can be, for example, a relay. However, the inventors have determined that a solid-state solution such as described herein provides enhanced reliability compared to the electromechanical solution.

Similar to the first speed circuit 128, the second speed circuit 132 (e.g., a high-speed circuit) includes a main circuit 160 having a main winding 164 and an auxiliary circuit 168 having a phase winding 172 and a capacitor 176. Although not illustrated, the second speed circuit 132 can also include a switch (e.g., a switch similar to the switch 156) associated with the auxiliary circuit 168. The illustrated second speed circuit 132 does not include a switch because operation of the first speed circuit 128 does not induce current through the second speed circuit 132 to the same extent as operation of the second speed circuit 132 does in the first speed circuit 128.

Figure 3:
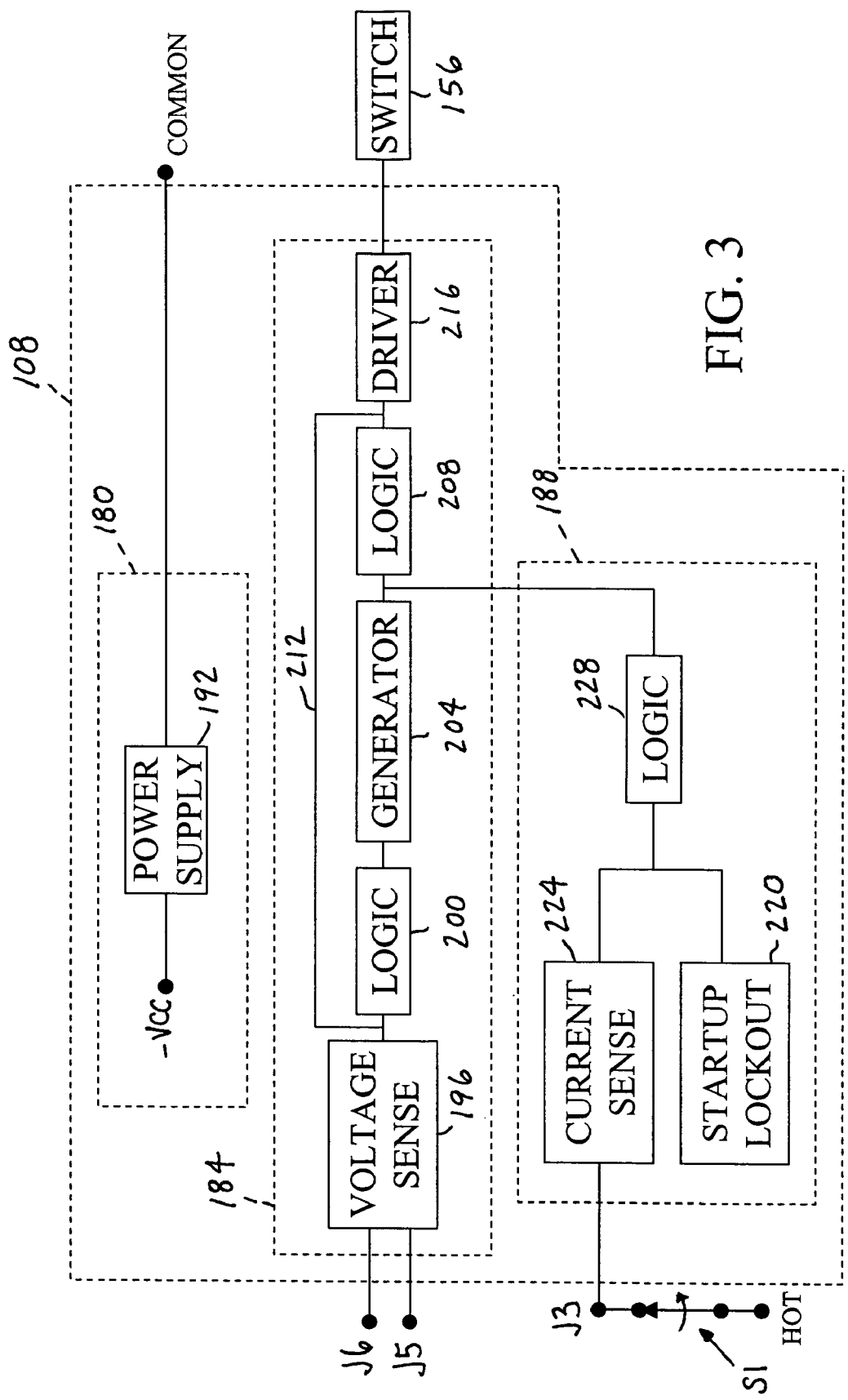
FIG. 3 illustrates a block diagram of the controller illustrated in FIG. 1.
Figure 4:
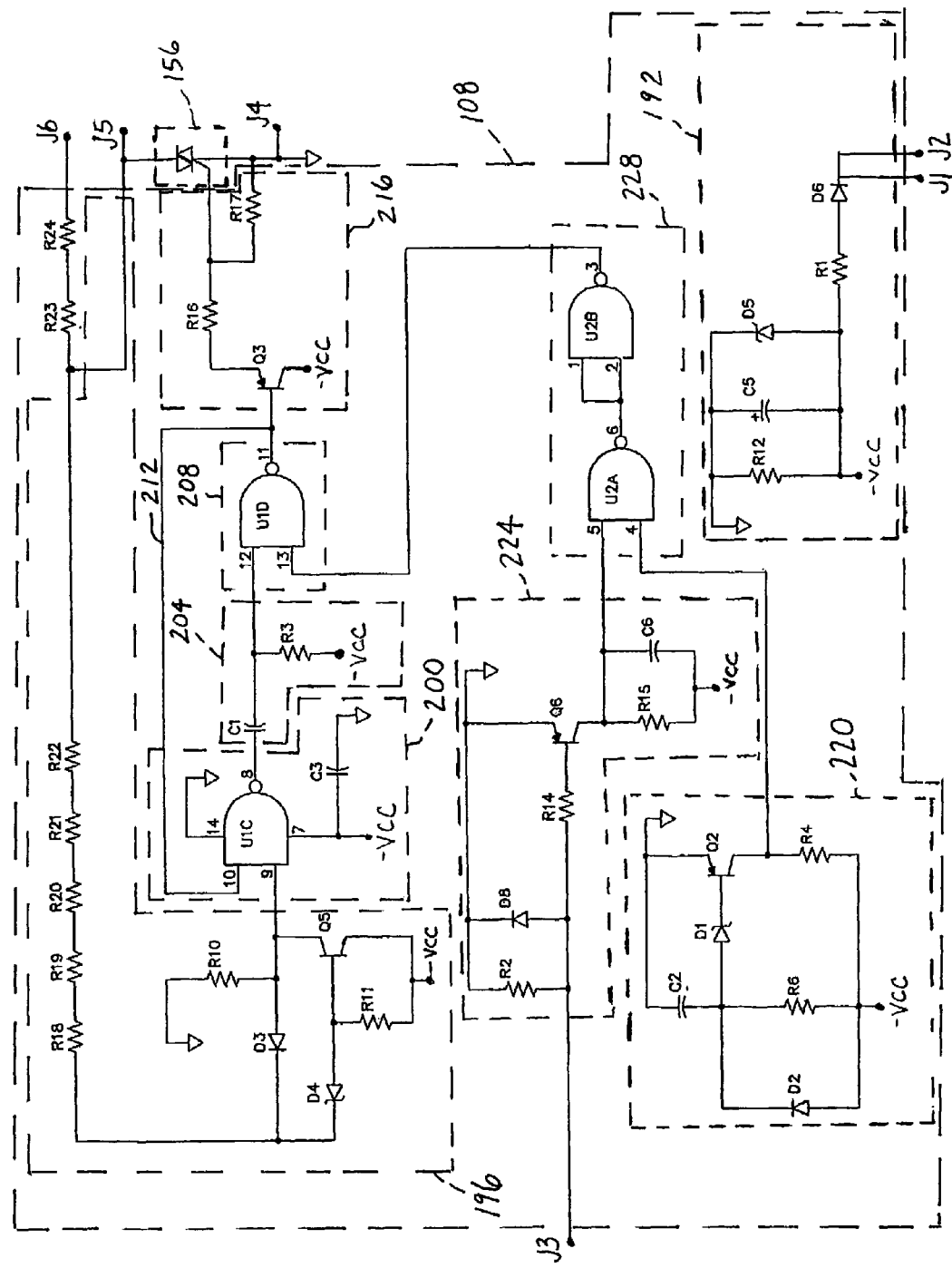
FIG. 4 illustrates a detailed schematic of the controller illustrated in FIG. 3.

FIG. 3 shows a block diagram of one construction of the controller 108. With reference to FIG. 3, the controller 108 includes a power supply block 180, a switch control block 184, and a circuit control block 188. FIG. 4 is a detailed schematic showing one exemplary construction of the controller 108.

With reference to FIG. 3, the power supply block 180 includes a power supply 192 that receives power (e.g., 115 VAC or 230 VAC power) from a power source and provides a regulated (i.e., a constant or consistent) power (e.g., a direct current power such as a −5 VDC power −VCC). With reference to FIG. 4, the illustrated power supply 192 includes resistors R1 and R12, capacitor C5, diode D6, and Zener diode D5. The power supply 192 is connected to a power source via jumpers J1 and J2. During operation of the power supply 192, diode D6 blocks current when a positive half-cycle voltage is across the power supply 192, and conducts when a negative half-cycle voltage is across the power supply 192. Conduction of diode D6 results in current through the resistor R1 that charges the capacitor C5. Zener diode D5 begins conducting when capacitor C5 achieves a voltage determined by the Zener diode D5, thereby limiting the voltage across capacitor C5. Resistor R12 dissipates the charge of capacitor C5 when power is removed from the power supply 192.

With reference to FIG. 3, the switch control block 184 can include a voltage sense circuit 196, a logic circuit 200, a generator circuit 204, a logic circuit 208, a pulse out connection 212, and a driver circuit 216. The switch control block 184 is configured to generate a signal (e.g., a gating pulse) that is utilized to control the switch 156. As discussed below, operation of the switch control block 184 may be overridden by the circuit control block 188 when certain conditions exist.

The voltage sense circuit 196 senses the voltage across the switch 156. More specifically, in the illustrated construction where the switch 156 comprises a triac, the voltage sense circuit 196 senses the inception of voltage after a zero crossing of the voltage across the switch 156. That is, the voltage sense circuit 196 senses when the switch 156 is turned OFF. A triac, once turned ON, remains ON until the alternating current through the triac goes to zero. When the triac turns OFF, a voltage appears across the triac. Therefore, sensing the voltage across the triac allows the voltage sense circuit 196 to generate an output that is indicative of whether the switch is turned ON or OFF.

With reference to FIG. 4, the illustrated voltage sense circuit 196 includes resistors R10, R11, R18, R19, R20, R21, and R22, diode D3, Zener diode D4, and transistor Q5. The voltage sense circuit 196 is connected to the first speed circuit 128 via jumper J5. The voltage sense circuit 196 determines whether the absolute value of voltage across the switch 156 (e.g., the triac voltage) is greater than a threshold (e.g., 5V, that is, whether the voltage across the switch 156 is greater than 5V or less than −5V). The threshold can be determined by the Zener diode D4. When the absolute value of the voltage across the switch 156 is greater than the threshold, the transistor Q5 conducts and the voltage sense circuit 196 generates a logic 0 output. When the absolute value of the voltage across the switch 156 is less than the threshold, the transistor Q5 is OFF and the voltage sense circuit 196 generates a logic 1 output.

Resistors R23 and R24 extend between jumpers J5 and J6 and are operable to discharge the capacitor 152 so the voltage across the capacitor 152 does not become higher than the peak voltage of the power line. If the voltage across the capacitor 152 did exceed the peak voltage of the power line, detection of the zero crossing events by the voltage sense circuit 196 may be effected.

The logic circuit 200 determines whether the output of the voltage sense circuit 196 will be utilized to control the generator circuit 204. With reference to FIG. 4, the illustrated logic circuit 200 includes NAND gate U1C. Capacitor C3, which is connected to the NAND gate U1C, acts as a despiking capacitor. The inputs to NAND gate U1C include an output from the voltage sense circuit 196 and an output from logic circuit 208. As discussed further below, the output from the logic circuit 208 is provided via the pulse out connection 212. The gate U1C generates a logic 1 output when at least one of the inputs is a logic 0 input, and generates a logic 0 output when both of the inputs are logic 1 inputs.

The output of the logic circuit 200 is utilized to control the generator circuit 204. The generator circuit 204 is configured to generate a signal to turn the switch 156 ON when the logic circuit 200 provides a logic 1 output. When the switch 156 is a triac, the generator circuit 204 can be a pulse generator that provides control pulses. Generally speaking, a triac is a bidirection gate controlled thyristor capable of conducting in either direction in response to a pulse. Therefore, the triac does not require a fixed control (or gate) current to turn ON the triac (i.e., to limit current through the triac). Instead, conduction of the triac can be maintained by providing the triac a short pulse of current (e.g., approximately 25 microseconds) each half cycle of the voltage applied to the switch 156. Thus, the pulses are narrow relative to the AC cycle of the power source (e.g., a 60 Hz power source). Such operation reduces the current requirements of the power supply 192, thus keeping circuit costs low.

With reference to FIG. 4, the illustrated generator circuit 204 includes a capacitor C1 and a resistor R3. When the output of the NAND gate U1C is logic 1, the voltage at pin 8 begins charging capacitor C1 such that the generator circuit 204 provides a logic 1 output for the time constant of capacitor C1 and resistor R3. When the output of the NAND gate U1C is logic 0, the generator circuit 204 also provides a logic 0 output.

The logic circuit 208 decides whether the signal provided by the generator circuit 205 should be utilized to control the switch 156. As discussed further below, the decision is based at least in part on the conditions of the circuit control block 188. With reference to FIG. 4, the illustrated logic circuit 208 includes NAND gate U1D. The inputs to gate U1D include an output from the generator circuit 204 and an output from logic circuit 228. The NAND gate U1D generates a logic 1 output when at least one of the inputs is a logic 0 input, and generates a logic 0 output when both of the inputs are logic 1 inputs.

The pulse-out connection 212 acts as a feedback loop between the logic circuit 208 and the logic circuit 200 such that the outputs of the logic circuit 208 are used as inputs to the logic circuit 200. The connection 212 prevents the output of the voltage sense circuit 196 from affecting the output of the logic circuit 212, and thus from influencing the generator 204, once a current pulse to the switch 156 is initiated. This feature makes sure the full current pulse is applied to the switch 156, and thus, prevents teasing the switch 156 ON. For example, without the connection 212, as the current pulse is applied to the gate of the switch 156, the switch 156 may partially turn ON (i.e., start conducting), and accordingly, the voltage across the switch 156 will reduce to near zero. This voltage drop may cause the voltage sense circuit 196 to respond as though the switch 156 is already ON, and therefore, instruct the generator 204 to terminate the current pulse to the gate of the switch 156. In this scenario, the switch 156 has not been fully turned ON, and because the gate current ceases prior to full latching of the switch 156, the switch 156 turns OFF. In response to the switch 156 turning OFF, the voltage sense circuit 196 detects a zero crossing event, and therefore, instructs the generator 204 to reapply the current pulse. The end result is a rapid oscillation of events that consumes power and results in unnecessary heating of the switch 156. The connection 212 ensures that the logic circuit 200 ignores the output of the voltage sense circuit 196 while the current pulse is being applied to the switch 156, thus ensuring the entire current pulse is applied to the switch 156 and that the switch 156 is fully turned ON as intended.

The output of the logic circuit 208 can be provided to the driver circuit 216 which acts as a current source for turning ON the switch 156. With reference to FIG. 4, the illustrated driver circuit includes a transistor Q3 and resistors R16 and R17. The transistor Q3 is switched ON or enabled in response to a logic 0 output from logic circuit 208.

With reference to FIG. 3, the circuit control block 188 can include a startup lockout circuit 220, a current sense circuit 224, and a logic circuit 228. The circuit control block 188 is configured to allow the switch control block 184 to control the switch 156 only when certain conditions exist.

The startup lockout circuit 220 is configured to ensure the power supply 192 is fully charged before the controller 108 attempts to actuate the switch 156. Without the startup lockout circuit 220, the controller 108 may attempt to pulse the switch 156 in response to a detection of operational power by the current sense circuit 224. Without a fully charged power supply 192, the switch 156 may turn ON in response to the pulse for one half of one AC voltage cycle, but the generator circuit 204 may not have enough energy left to pulse the switch 156 during the next half of the AC voltage cycle (e.g., after the switch 156 turns OFF due to a zero-crossing event). If this happens, the charge on the capacitor 152 may become higher than the peak voltage of the power line and may prevent the voltage sense circuit 196 from sensing the zero-voltage crossing used to initiate the generator circuit 204. Accordingly, in some constructions, the controller 108 includes the startup lockout circuit 220 which is operable to prevent the generator 204 from pulsing the switch 156 until the power supply 192 is adequately charged.

With reference to FIG. 4, the illustrated startup lockout circuit 220 includes resistors R4 and R6, capacitor C2, diode D2, Zener diode D1, and transistor Q2. The startup lockout circuit 220 is configured to provide a logic 0 output until the capacitor C2 charges to a voltage greater than a threshold value. In the illustrated construction, the threshold value is established by the reverse breakdown voltage of Zener diode D1.

The current sense circuit 224 senses the current being provided by the power source to the first speed circuit 128. In the illustrated construction, the current sense circuit 224 is operable to sense peak current flowing to the first speed circuit 128. More specifically, the current sense circuit 224 is operable to detect when current is being drawn by either one or both of the main circuit 136 and the auxiliary circuit 144. The illustrated current sense circuit 224 is connected in series with a speed switch S1 to sense when operational power is provided to the first speed circuit 128. The speed switch S1 can be one of a variety of types of switches that can be actuated to switch the motor 110 for operation at a desired speed of the motor.

The current sense circuit 224 compares the sensed current with a threshold value. The result of the comparison is provided to the logic circuit 228 and utilized as discussed further below. Although the illustrated construction is described as detecting the presence of peak current in the first speed circuit 128, in other constructions, other circuits may be utilized to detect the presence and/or absence of operational power. For example, the circuits may detect the presence and/or absence of at least one of current associated the operational power, voltage associated with the operational power, frequency associated with the operational power, and combinations thereof.

With reference to FIG. 4, the illustrated current sense circuit 224 includes resistors R2, R14, and R15, capacitor C6, diode D8, and transistor Q6. The current sense circuit 224 is connected to the speed switch S1 via jumper J3. When current begins to flow to the low-speed circuit 128 (via resistor R2 and jumper J4), the output of the current sense circuit 224 is enabled as soon as the peak current in the low-speed circuit 224 is sufficient to bias transistor Q6 to an active state. Accordingly, the current sense circuit 224 is very sensitive to peak current flowing in the low-speed circuit 128 and does not require scaling or tuning of a detection threshold.

The diode D8 is designed as a bypass for the positive pulses of the current sensed by the current sense circuit 224, thus reducing the dissipation in resistor R2. When the voltage drop across resistor R2 is greater than a threshold, transistor Q2 is switched ON or enabled. This causes the capacitor C6 to charge. Based on the alternating nature of the sensed current, the transistor Q2 switches ON and OFF during each negative going pulse that includes a current sufficient to bias the transistor Q6. The capacitor C6 is designed to hold the output of the current sense circuit 224 at logic 1 until the next negative pulse of the alternating current reenables the transistor Q6. The resistor R15 is configured to discharges the capacitor C6 when consecutive negative pulses of the sensed alternating current do not enable the transistor Q6. Values of the resistor R15 and the capacitor C6 can be established to provide a time constant longer than a period of the alternating current that is expected. The illustrated current sense circuit 224 provides a logic 1 output when the sensed peak current is greater than a threshold value and a logic 0 output when the sensed peak current is less than a threshold value.

The logic circuit 228 decides whether the output of the current sense circuit 224 should be utilized as an input to the logic circuit 208. With reference to FIG. 4, the illustrated logic circuit 228 includes NAND gates U2A and U2B connected in series. The inputs to gate U2A include an output from the startup lockout circuit 220 and an output from the current sense circuit 224. The NAND gate U2A generates a logic 1 output when at least one of the inputs is a logic 0 input, and generates a logic 0 output when both of the inputs are logic 1 inputs. The output of the NAND gate U2A is utilized for both inputs of NAND gate U2B. The NAND gate U2B generates a logic 0 output when the output of the NAND gate U2A is logic 1 (i.e., when at least one of the inputs to the NAND gate U2A is a logic 0), and generates a logic 1 output when the output of the NAND gate U2A is logic 0 (i.e., when both inputs to the NAND gate U2A are logic 1). When the NAND gate U2B generates a logic 0 output, operation of the switch control block 184 is overridden by the circuit control block 188. When the NAND gate U2B generates a logic 1 output, operation of the switch control block 184 is not overridden by the circuit control block 188.

During operation of the motor 110, the switch 156 can limit current through the auxiliary circuit 144 when operational power is provided to the second speed circuit 132, thus effectively eliminating the tank circuit between the first speed circuit 128 and the second speed circuit 132. As discussed above, elimination of the tank circuit improves the operating efficiency of the motor 110.

For operation of the motor 110, the speed switch S1 is actuated to control whether the first speed circuit 128 or the second speed circuit 132 receives operational power. Thus, the speed switch S1 effectively controls the operating speed of the motor 110 (e.g., a low-speed, a high-speed, and the like). Although the first speed circuit 128 does not receive operational power when operational power is provided to the second speed circuit 132, the controller 108 may still power-up based on the transformer action of the motor 110. That is, because the windings 140, 148, 160, 172 are wound on a common stator core, when current flows through the second speed circuit 132, a magnetic field is generated which can induce a voltage across the main circuit 136 of the first speed circuit 128. Although current through the first speed circuit 128 is limited when the auxiliary circuit 144 is removed from the first speed circuit 128 (i.e., the main circuit 136 and the auxiliary circuit 144 form an open loop), the voltage induced across the main circuit 144 in combination with a small induced current which can result generally cause the controller 108 to power-up (i.e., the power supply 192 generates a direct current power sufficient to power the components of the controller 108).

When the speed switch S1 is actuated to initially provide operational power to the first speed circuit 128, the controller 108 needs to initialize (i.e., the power supply 192 needs to charge to a level adequate to power components of the controller 108). Until the power supply 192 is adequately charged, the startup lockout circuit 220 provides a logic 0 output, which as discussed above, prevents the switch control block 184 from pulsing the switch 156. Once the power supply 192 is adequately charged, the output of the startup lockout circuit 220 changes to logic 1 and operation of the switch control block 184 is dependent on whether operational power is detected. The startup lockout circuit 220 is generally only utilized when the motor 110 is started in a low-speed mode (i.e., when the controller 108 needs to initialize). When the motor 110 is operated in a high-speed mode and then switched to the low-speed mode, the controller 108 is generally initialized based on the transformer action of the motor 110 as discussed above.

Once the controller 108 is initialized, if the current sense circuit 224 senses the peak current to the first speed circuit 128, the output of the current sense circuit 224 is logic 1 and control of the switch 156 is dependent on operation of the generator 204. As discussed above, the generator circuit 204 can generate control pulses when the voltage sense circuit 196 senses inception of a voltage across the switch 156 after a zero crossing event. Based on the control signal from the generator circuit 204, the logic circuit 208 controls the drive circuit to trigger (or re-trigger) the switch 156. When the switch 156 is triggered, current is allowed through the auxiliary circuit 144, resulting in standard PSC operation.

Once the first speed circuit 128 is running, the current pulses are generated each time the voltage across the switch 156 passes through zero voltage. The current pulse is generally applied just after the zero crossing event, and thus the full AC voltage waveform is applied to the low-speed circuit 128. Generally, operation of the first speed circuit 128 continues in this manner until the current sense circuit 224 senses no current, indicating the low-speed circuit 128 is switched OFF. The switch 156 is then switched OFF or otherwise disabled. In the illustrated construction, turning the switch 156 OFF effectively removes the auxiliary circuit 144 from the first speed circuit 128.

As used herein and in the appended claims, the controller 108 can control the switch 156 whether initialized or not. When not initialized, the controller 108 controls the switch 156 by not turning ON the switch 156. When the switch 156 is turned OFF, the switch 156 limits current through the auxiliary circuit 144. In other constructions, the switch 156 may be a normally ON switch and a control signal provided by the controller may turn the switch OFF to limit current through the auxiliary circuit.

It is envisioned that the controller 108 can be designed differently for other types of switches (e.g., a relay, other types of electronic switches, and the like). Further, it should be noted that the components illustrated in FIGS. 3 and 4 are merely exemplary and not to be considered limiting. Other alternative or additional components may be used to implement constructions of the invention. For example, in at least one construction, the invention may be implemented using a single integrated circuit. Although the logic circuits 200, 208, and 228 are shown and described as comprising NAND gates, it is understood that the controller 108 can be readily redesigned for other gate types. Further, although the controller 108 is described herein as comprising on hardware elements, in other constructions the controller can comprise hardware elements, software elements, and/or a combination of hardware and software elements.

Various features and aspects of the invention are set forth in the following claims.

What is claimed is:

1. A method of controlling an electric machine, the electric machine comprising a rotor and a stator, the method comprising:
   providing an electric machine comprising
      a first speed circuit comprising a first main winding, an auxiliary winding, and a switch connected in series with the auxiliary winding, and
      a second speed circuit comprising a second main winding;
   providing an operational power to one of the first speed circuit and the second speed circuit;
   detecting which of the first speed circuit and the second speed circuit is receiving the operational power,
      wherein detecting which of the first speed circuit and the second speed circuit is receiving the operational power comprises at least one of detecting an existence of the operational power, and detecting an absence of the operational power, and
      wherein detecting an existence of the operational power comprises detecting at least one of a current associated with the operational power, a voltage associated with the operational power, and a frequency associated with the operational power; and
   controlling the switch to limit current through the auxiliary winding based at least in part on the provision of the operational power to the second speed circuit.

2. A method according to claim 1 and further comprising controlling the switch to allow current through the auxiliary winding based at least in part on the provision of the operational power to the first speed circuit.

3. A method according to claim 1 wherein the first speed circuit comprises an auxiliary circuit, wherein the auxiliary circuit comprises the auxiliary winding and a capacitor connected in series with the auxiliary winding, wherein controlling the switch to limit current through the auxiliary winding comprises controlling the switch to limit current through the auxiliary winding and the capacitor based at least in part on the provision of the operational power to the second speed circuit.

4. A method according to claim 1 wherein detecting a current associated with the operational power comprises detecting a peak current associated with the operational power.

5. A method according to claim 1 wherein the switch comprises a solid-state switch.

6. A method as set forth in claim 1 wherein detecting an existence of the operational power comprises detecting a current associated with the operational power.

7. A method as set forth in claim 1 wherein detecting an existence of the operational power comprises detecting a voltage associated with the operational power.

8. A method as set forth in claim 1 wherein detecting an existence of the operational power comprises detecting a frequency associated with the operational power.

9. An electric machine assembly comprising:
   a shaft;
   a rotor connected to the shaft for rotation with the shaft;
   a first speed circuit comprising a first main circuit, a first auxiliary circuit, and a switch connected in series with the first auxiliary circuit, wherein the first speed circuit is of a permanent split capacitor design, the first speed circuit being configured to cause the rotor and shaft to rotate at a first speed when an operational power is provided to the first speed circuit;

a second speed circuit comprising a second main circuit and a second auxiliary circuit, wherein the second speed circuit is of a permanent split capacitor design, the second speed circuit being configured to cause the rotor and shaft to rotate at a second speed when an operational power is provided to the second speed circuit; and a controller comprising a current sensor coupled in circuit with the first speed circuit to sense a current of the first speed circuit, the controller being configured to control operation of the switch based at least in part on whether an operational power is provided to the first speed circuit or the second speed circuit, the controller controlling the switch to limit current through the switch when the second speed circuit receives the operational power, wherein controlling operation of the switch based at least in part on whether an operational power is provided to the first speed circuit or the second speed circuit is based at least in part on an output of the current sensor.

10. An electric machine comprising:

a shaft;

a rotor connected to the shaft for rotation with the shaft;

a first speed circuit comprising a first main circuit, a first auxiliary circuit, and a switch connected in series with the first auxiliary circuit, wherein the first speed circuit is of a permanent split capacitor design, the first speed circuit being configured to cause the rotor and shaft to rotate at a first speed when an operational power is provided to the first speed circuit;

a second speed circuit comprising a second main circuit and a second auxiliary circuit, wherein the second speed circuit is of a permanent split capacitor design, the second speed circuit being configured to cause the rotor and shaft to rotate at a second speed when an operational power is provided to the second speed circuit;

a controller configured to control operation of the switch based at least in part on whether an operational power is provided to the first speed circuit or the second speed circuit, the controller controlling the switch to limit current through the switch when the second speed circuit receives the operational power; and wherein the controller comprises a direct current power supply and a startup lockout circuit, and wherein the startup lockout circuit is configured to prevent the controller from controlling operation of the switch until the direct current power supply is adequately charged to power components of the controller.

11. An electric machine according to claim 9 wherein the switch comprises a solid-state switch, and wherein the controller utilizes gating pulses to control operation of the solid-state switch.

12. An electric machine according to claim 11 wherein the switch comprises a triac.

13. An electric machine comprising:

a shaft;

a rotor connected to the shaft for rotation with the shaft;

a first speed circuit comprising a first main circuit, a first auxiliary circuit, and a switch connected in series with the first auxiliary circuit, wherein the first speed circuit is of a permanent split capacitor design, the first speed circuit being configured to cause the rotor and shaft to rotate at a first speed when an operational power is provided to the first speed circuit;

a second speed circuit comprising a second main circuit and a second auxiliary circuit, wherein the second speed circuit is of a permanent split capacitor design, the second speed circuit being configured to cause the rotor and shaft to rotate at a second speed when an operational power is provided to the second speed circuit;

a controller configured to control operation of the switch based at least in part on whether an operational power is provided to the first speed circuit or the second speed circuit, the controller controlling the switch to limit current through the switch when the second speed circuit receives the operational power;

wherein the switch comprises a solid-state switch, and wherein the controller utilizes gating pulses to control operation of the solid-state switch; and wherein the controller comprises a voltage sense circuit configured to sense a voltage across the solid-state switch and generate an output indicative of when the solid-state switch has turned off, and wherein the output is utilized to generate the gating pulses.

14. An electric machine according to claim 13 wherein the output of the voltage sense circuit is ignored during the delivery of a gating pulse to the solid-state switch.

15. An electric machine comprising:

a shaft;

a rotor connected to the shaft for rotation with the shaft;

a first speed circuit comprising a first main circuit, a first auxiliary circuit, and a switch connected in series with the first auxiliary circuit, the first speed circuit being configured to cause the rotor and shaft to rotate at a first speed when an operational power is provided to the first speed circuit;

a second speed circuit comprising a second main circuit and a second auxiliary circuit, the second speed circuit being configured to cause the rotor and shaft to rotate at a second speed when an operational power is provided to the second speed circuit;

a controller configured to control operation of the switch based at least in part on whether an operational power is provided to the first speed circuit or the second speed circuit, the controller controlling the switch to limit current through the switch when the second speed circuit receives the operational power; and wherein the controller comprises a plurality of logic gates utilized to control operation of the switch based at least in part on at least one of detection of a direct current power level, detection of a peak current, generation of a control signal to turn on the switch, and detection of an inception of voltage after a zero-crossing of the voltage across the switch.

16. A method of controlling an electric machine, the electric machine comprising a rotor and a stator, the method comprising:

providing an electric machine comprising
a first speed circuit of a permanent split capacitor design, the first speed circuit comprising
a first main circuit comprising a first main winding,
a first auxiliary circuit comprising a first phase winding and a first capacitor connected in series with the first phase winding, and
a solid-state switch connected in series with the auxiliary circuit,
a second speed circuit of a permanent split capacitor design, the second speed circuit comprising
a second main circuit comprising a second main winding, and a second auxiliary circuit comprising a second phase winding and a second capacitor connected in series with the second phase winding, providing an operational power to one of the first speed circuit and the second speed circuit;

detecting a peak current of the first speed circuit to determine whether the first speed circuit or the second speed circuit is receiving the operational power;

controlling the solid-state switch to allow current through the auxiliary winding based at least in part on the provision of the operational power to the first speed circuit.

17. A method according to claim 16 and further comprising controlling the solid-state switch to limit current through the auxiliary winding based at least in part on the provision of the operational power to the second speed circuit.

18. A method according to claim 1 wherein detecting an absence of the operational power comprises detecting an absence of at least one of a current associated with the operational power, a voltage associated with the operational power, a frequency associated with the operational power, and a combination of detecting an absence of a current associated with the operational power, a voltage associated with the operational power, and a frequency associated with the operational power.

19. A method as set forth in claim 18 wherein detecting an absence of the operational power comprises detecting an absence of a current associated with the operational power.

20. A method as set forth in claim 18 wherein detecting an absence of the operational power comprises detecting an absence of a voltage associated with the operational power.

21. A method as set forth in claim 18 wherein detecting an absence of the operational power comprises detecting an absence of a frequency associated with the operational power.

* * * * *